United States Patent [19]

Yamagata et al.

[11] Patent Number: 5,557,480
[45] Date of Patent: Sep. 17, 1996

[54] RECORDING AND/OR REPRODUCING APPARATUS FOR DISPLAYING DATA DIFFERENTLY IN RECORDING AND REPRODUCTION

[75] Inventors: Shigeo Yamagata; Toyokazu Mizogui, both of Kanagawa-ken, Japan

[73] Assignee: Canon Kabushiki Kaisha, Tokyo, Japan

[21] Appl. No.: 389,725

[22] Filed: Feb. 15, 1995

Related U.S. Application Data

[63] Continuation of Ser. No. 97,736, Jul. 27, 1993, abandoned, which is a continuation of Ser. No. 771,792, Oct. 4, 1991, abandoned, which is a continuation of Ser. No. 453,063, Dec. 11, 1989, abandoned, which is a continuation of Ser. No. 7,774, Jan. 28, 1987, abandoned.

[30] Foreign Application Priority Data

Jan. 31, 1986 [JP] Japan .................................. 61-017842

[51] Int. Cl.$^6$ ................................................. H04N 5/78
[52] U.S. Cl. ............................ 360/33.1; 360/62; 360/31; 358/335
[58] Field of Search ................................. 358/183, 906, 358/142, 335, 310; 360/18, 33.1, 62, 29, 31

[56] References Cited

U.S. PATENT DOCUMENTS

| | | | |
|---|---|---|---|
| 3,891,792 | 6/1975 | Kimura | 358/142 |
| 3,900,887 | 8/1975 | Loga et al. | 360/18 |
| 4,051,524 | 9/1977 | Baxter | 360/33.1 X |
| 4,142,244 | 2/1979 | Garner et al. | 364/900 |
| 4,216,492 | 8/1980 | Schmaly | 360/18 X |
| 4,321,642 | 3/1982 | Fukuoka | 360/62 |
| 4,366,501 | 12/1982 | Tsunekawa et al. | 360/9.11 |
| 4,420,773 | 12/1983 | Toyoda et al. | 358/906 X |
| 4,456,931 | 6/1984 | Toyoda et al. | 358/335 |
| 4,471,382 | 9/1984 | Toyoda et al. | 358/22 |
| 4,570,182 | 2/1986 | Johnson et al. | 358/22 |
| 4,654,633 | 3/1987 | Tonomura | 358/142 X |
| 4,698,666 | 10/1987 | Lake, Jr. et al. | 358/22 |
| 4,736,256 | 4/1988 | Ichikawa | 358/335 |
| 4,740,828 | 4/1988 | Kinoshita | 358/906 |
| 5,267,102 | 11/1993 | Yamagata | 360/35.1 X |

FOREIGN PATENT DOCUMENTS

| | | | |
|---|---|---|---|
| 2717244 | 4/1977 | Germany. | |
| 47706 | 6/1977 | Japan | 360/18 |
| 52-76022 | 6/1977 | Japan | 360/18 |

OTHER PUBLICATIONS

Technical Guide No. 39, V.40 Mar. 1985.

*Primary Examiner*—Andrew L. Sniezek
*Attorney, Agent, or Firm*—Robin, Blecker, Daley & Driscoll

[57] ABSTRACT

In a recording-and-reproducing apparatus which has data setting arrangement for setting a data signal to be recorded on a recording medium by multiplexing the data together with a recording video signal and is arranged to be capable of reproducing the video signal and the data signal from the recording medium, a monitor is arranged to display the video signal and the data signal; and, during recording or reproduction, the data signal set by the data setting arrangement for recording and the data signal reproduced are arranged to be displayed on the monitor in different manners from each other, so that a data setting process for recording and a data reproducing process can be readily distinguished from each other.

14 Claims, 8 Drawing Sheets

RECORDING AND/OR REPRODUCING APPARATUS FOR DISPLAYING DATA DIFFERENTLY IN RECORDING AND REPRODUCTION

This is a continuation application under 37 CFR 1.62 of prior application Ser. No. 08/097,736, filed Jul. 27, 1993 abandoned, which is a continuation of Ser. No. 07/771,792, filed Oct. 4, 1991, abandoned, which is a continuation of Ser. No. 453,063, filed Dec. 11, 1989, abandoned, which is a continuation of Ser. No. 07/007/774, filed Jan. 28, 1987, abandoned.

BACKGROUND OF THE INVENTION

1. Field of the Invention

This invention relates to a recording and/or reproducing apparatus and more particularly to an apparatus for recording or reproducing a video signal and a data signal on or from a recording medium on which the video signal and the data signal are recorded together in a multiplexing manner.

2. Description of the Related Art

In a recording and/or reproducing apparatus of the kind recording or reproducing a data signal along with a video signal in a multiplexing manner, the number of recordable data is limited. Accordingly, the number of data that can be displayed is also limited. Generally, characters such as letters and symbols are used for a plurality of data. Hence, some codes corresponding to these data are frequency multiplexed together with the video signal.

However, in the conventional recording and/or reproducing apparatus, the data signal to be displayed during reproduction is arranged to be displayed in the same manner as in recording. Therefore, the data signal display does not enable the operator to readily discriminate between a recording mode and a reproducing mode. As a result, the operator might faultily perform, for example, a data setting and recording operation while the apparatus is in the reproducing mode.

SUMMARY OF THE INVENTION

A first object of this invention is to solve the above stated problem of the prior art.

A second object of this invention is to provide a recording and/or reproducing apparatus which solves the above stated problem by enabling the operator to readily discriminate between the recording and reproducing modes of the apparatus.

A third object of this invention is to provide a recording and/or reproducing apparatus which enables the operator to readily know whether a data signal being monitored is being reproduced or under a setting process for recording.

Under this object, a recording and/or reproducing apparatus arranged as a preferred embodiment of the invention comprises: data setting means for setting data to be recorded on a recording medium; recording means for recording on the recording medium a video signal and a signal representing the data set by the data setting means by multiplexing the video signal and the data signal together; reproducing means for reproducing the video signal and the data signal from the recording medium; display means for displaying the video signal and the data signal; and means for making a distinction between the data signal set by the data setting means and the data signal reproduced by the reproducing means and for causing the display means to display the data signal with the distinction.

It is another object of this invention to provide a recording apparatus which facilitates a setting operation on a data signal to be recorded along with a video signal.

It is a further object of this invention to provide a recording apparatus which is arranged to permit a setting operation on a data signal to be recorded along with a video signal by observing the video signal while the video signal is displayed on a monitor.

These and further objects and features of this invention will become apparent from the following detailed description of preferred embodiments thereof taken in conjunction with the accompanying drawings.

DETAILED DESCRIPTION OF THE PREFERRED EMBODIMENTS

Figure 1:
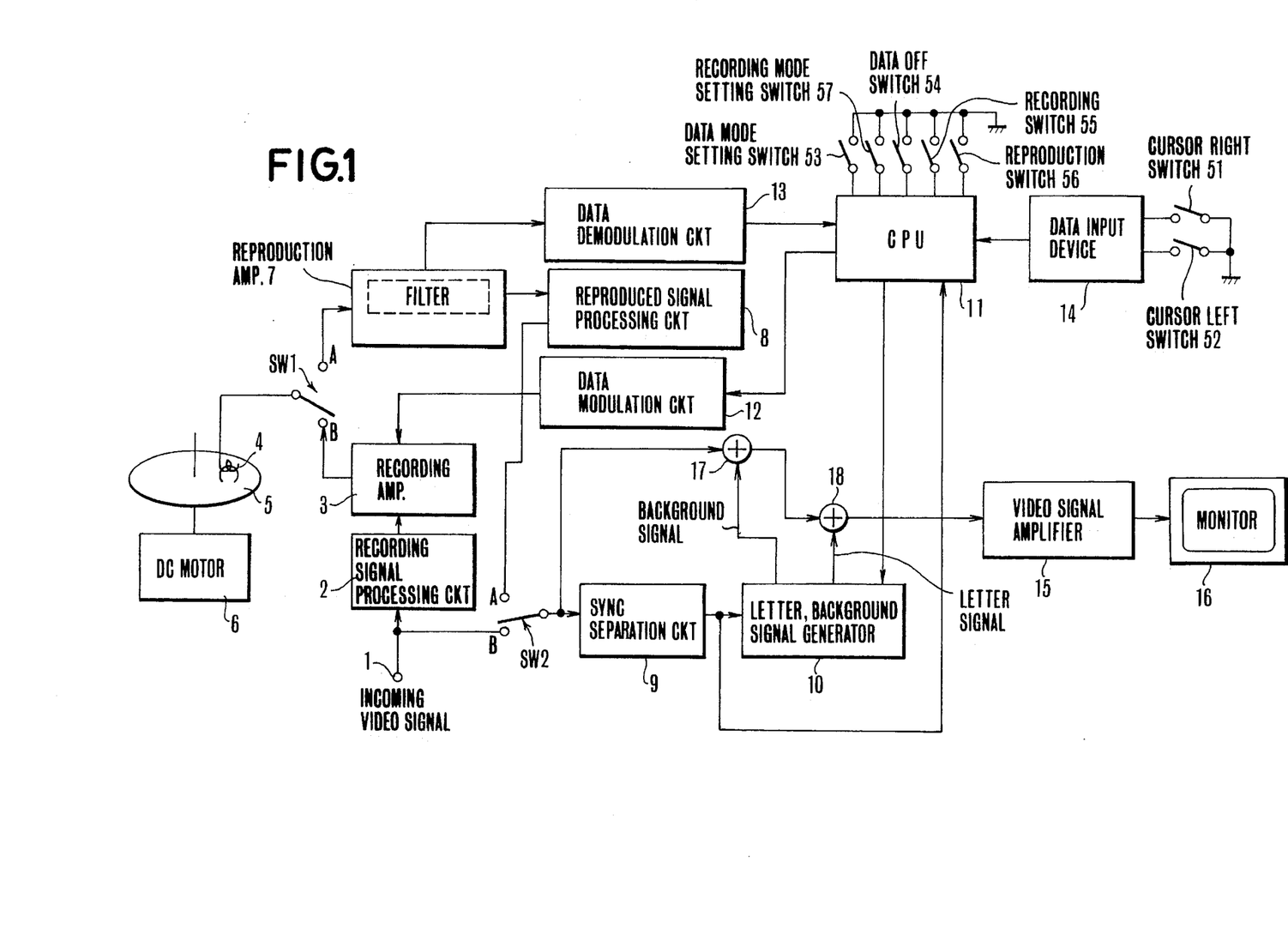
FIG. 1 is a block diagram showing a first embodiment of this invention.

An embodiment of this invention is arranged as described below with reference to the accompanying drawings:

In FIG. 1, an input terminal 1 is arranged to receive a video signal. A recording signal processing circuit 2 is arranged to receive the video signal from the input terminal 1 and to modulate the signal into a signal suited for magnetic recording with other processes also carried out as necessary for recording. A recording amplifier 3 is arranged to add together the signal produced from the recording signal processing circuit 2 and a signal produced from a data modulation circuit 12 which will be described later and to amplify the result of the addition. The signal from the data modulation circuit 12 and the signal from the recording signal processing circuit 2 are frequency multiplexed together. A magnetic sheet 5 is arranged to be rotated by a DC motor 6. A reference numeral 4 denotes a magnetic head.

A reproduction amplifier 7 is arranged to amplify a signal reproduced from the magnetic sheet 5 by the magnetic head 4 and to divide the reproduced signal into a data signal component and a video signal component by means of a filter which is included in the amplifier 7. A reproduced signal processing circuit 8 is arranged to receive the signal wave of the video signal component produced from the reproduction amplifier 7 and to demodulate the signal wave along with other processes necessary for reproduction.

A CPU 11 is arranged to perform various control actions as will be described later. The CPU 11 includes a ROM and a RAM which are arranged to store information on the procedures shown in FIGS. 7(A) to 7(E). A sync separation circuit 9 is arranged to separate synchronizing signal from a video signal coming via a switch SW2. A letter, background signal generator 10 is arranged to produce a signal which either designates, according to synchronizing signals produced from the sync separation circuit 9, the horizontal and vertical display positions on a monitor 16 of letters, symbols and other characters such as numerals and a display background or represents the letters or characters and the background. The signal representing the letters or characters and the background is under the control of the CPU 11. A data demodulation circuit 13 is arranged to demodulate a data signal produced from the reproduction amplifier 7.

The CPU 11 is arranged to control the switching positions of switches SW1 and SW2; to control the letter, background signal generator 10 to cause the generator 10 to generate characters such as letters and symbols corresponding to data supplied by a data input device 14; to supply a data modulation circuit 12 with a code corresponding to the data supplied; to receive a data signal produced from the data demodulation circuit 13; to discriminate the demodulated data signal; and then to cause the letter, background signal generator 10 to generate characters such as letters and symbols corresponding to the data represented by the data signal. The data modulation circuit 12 is arranged to receive and demodulate the code corresponding to the characters of the data signal produced from the CPU 11 and to supply it to the recording amplifier 3. Furthermore, though not shown, the data input device 14 includes a data input switch for designating numerals "0" to "9".

A video signal amplifier 15 is arranged to drive a monitor 16. An addition circuit 17 is arranged to add a background signal produced from the letter, background signal generator 10 to a video signal obtained via the switch SW2. Another addition circuit 18 is arranged to add to the video signal a character (or letter) signal produced from the letter, background signal generator 10. The output of the addition circuit 18 representing the result of addition is supplied to the video signal amplifier 15 and is displayed on the monitor 16.

A cursor right switch 51 and a cursor left switch 52 are connected to the data input device 14. A data mode setting switch 53 is arranged for setting a data signal. A data off switch 54 is arranged for stopping the data signal from being recorded. A recording switch 55 is provided for recording the video signal and the data signal when a recording mode is set by means of a recording mode setting switch 57. A switch 56 is provided for setting the apparatus into a reproducing mode.

Figure 7A:
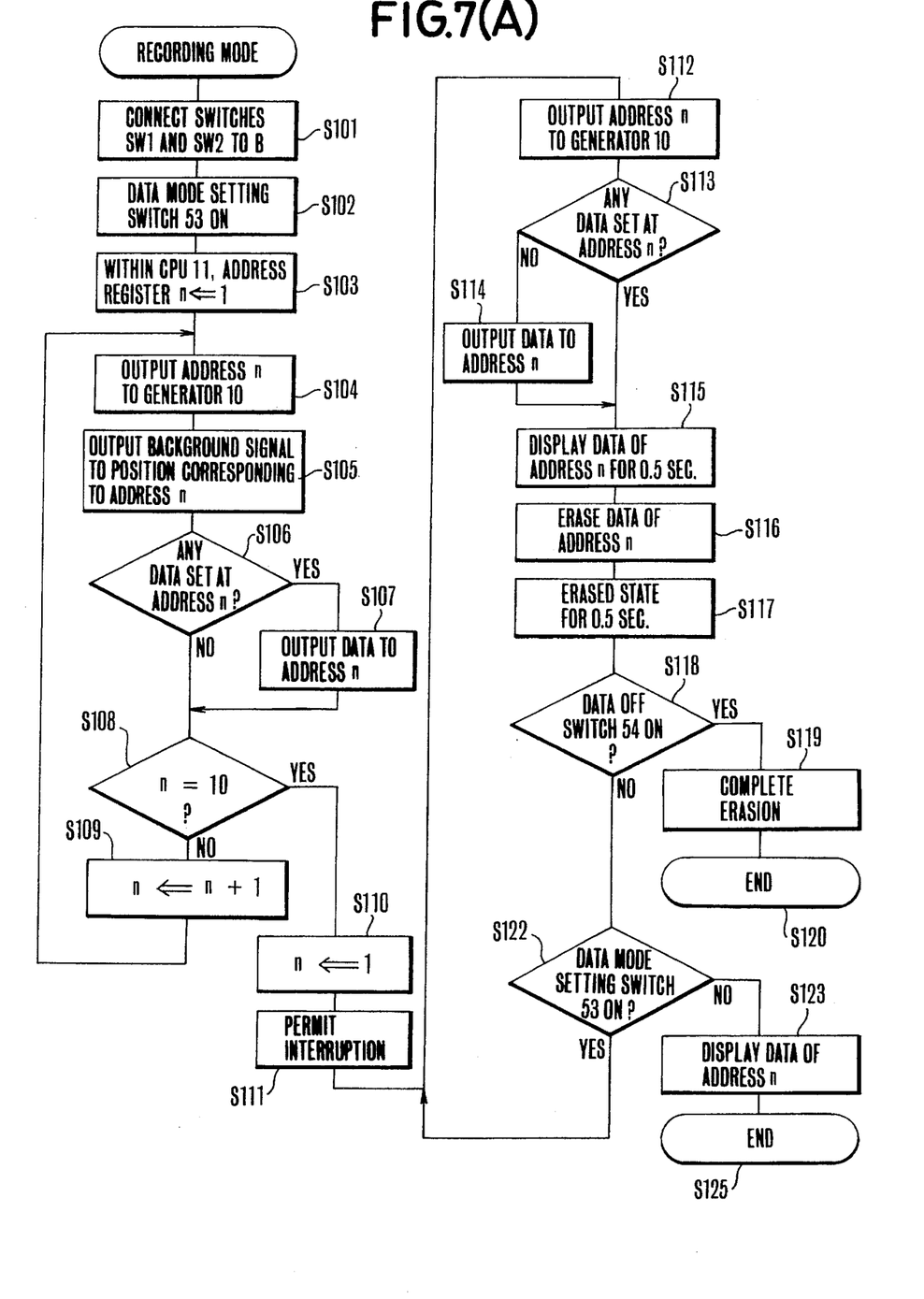
FIGS. 7(A) to 7(E) are flow charts showing the operation of the first embodiment of this invention.

The details of the operation of the embodiment are as described below:

FIG. 7(A) shows the operation in the recording mode, which is set when the recording mode setting switch 57 is turned on. At a step S101: The connecting position of the switch SW2 is shifted to a terminal B thereof. At a step S102: The data mode setting switch 53 turns on. At a step S103: The value of an address n of an address register within the CPU 11 is made to be 1. There are provided a total of ten addresses each of which is arranged to permit setting of a character (letter, numeral, symbol or the like) as data. At a step S104: the data of the address n (1 in this instance) is designated by supplying it to the letter, background signal generator 10. At a step S105: The letter, background signal generator 10 produces a background signal corresponding to the designated address n (=1) and supplies it to the addition circuit 17. Then, an applicable background is displayed in an applicable part on the monitor 16.

Step S106: A check is made to see if data (character) is set at an address n (=1) of the RAM which is arranged within the CPU 11 to temporarily store data. If so, the flow of operation proceeds to a step S107. Step S107: The CPU 11 controls the letter, background signal generator 10 to cause it to produce and supply a character signal corresponding to the data to the addition circuit 18. The character is displayed on the monitor 16 in a position corresponding to the address n(=1). Then, the operation proceeds to a step S108. If, at the step S106, no data is found to have been set, the flow of operation comes to the step S108.

Step S108: The address n of the address register of the CPU 11 is checked to see if it is at 10. Since the address n is not at 10 in this instance, the flow proceeds to a step S109. Step S109: The address n is changed to an address n+1 (=2). The flow then comes back to the step S104. Then, the loop of steps S104 to S109 is repeated. By this, the background is displayed on the monitor in a part corresponding to the addresses n=1. Then, if any data has been set, a character is also displayed in a part corresponding to the setting part of the data. The display, therefore, enables the operator to readily distinguish a data setting area from an area in which data has not been set. In accordance with the arrangement of this embodiment, the steps from S101 to S109 are carried out and the set data is automatically reproduced to be displayed on the image plane of the monitor 16 with the recording mode setting switch 57 simply turned on. This arrangement, however, may be changed, for example, to arrange the step S102 as a discriminating step to allow the step S103 and ensuing steps to be carried out when the data mode setting switch 53 is found to have been turned on. At the step S108: When there obtains the state of n=10, the flow of operation comes to a step S110. Step S110: The value of the address n of the address register of the CPU 11 is temporarily brought back to 1. Then, the flow proceeds to a step S111. Step S111: There obtains an interruption permitting mode. The process of interruption will be described later on. At Step S112: The data of address n (=1) is designated and supplied to the letter, background signal generator 10. Step S113: A check is made to see if data is set at the address n (=1) of the RAM within the CPU 11. If not, the flow proceeds to a step S114. Step S114: The letter, background signal generator 10 is caused to generate a mark "?" indicating that no data is set at the above stated address. This mark "?" is displayed at an applicable part on the monitor 16. The flow then proceeds to a step S115. Step S115: If data is found at the step S113 to have been set, a character or characters corresponding to the data is likewise displayed at the applicable part on the monitor for a period of 0.5 sec.

Figure 2A:
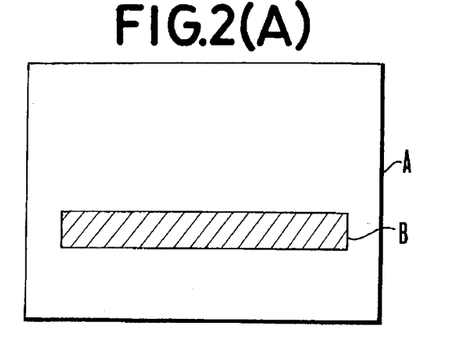
FIGS. 2(A), 2(B), 3(A), 3(B), 4(A), 4(B) and 5 are illustrations of different modes of data display to be made by the same embodiment.
Figure 2B:
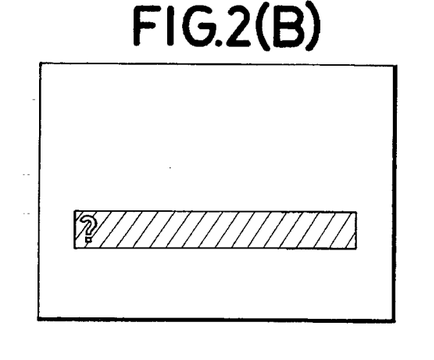
Figure 3A:
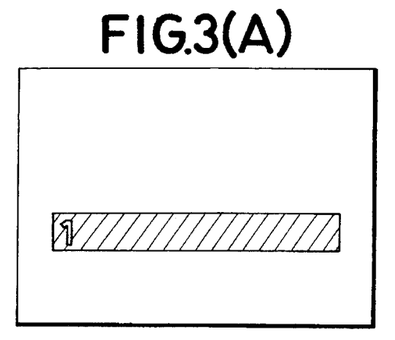
Figure 3B:
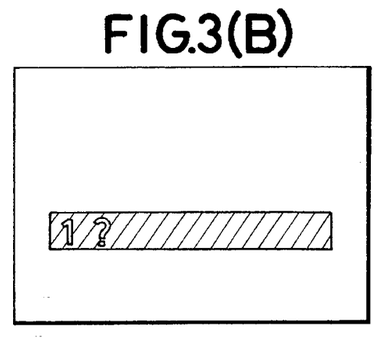
Figure 4A:
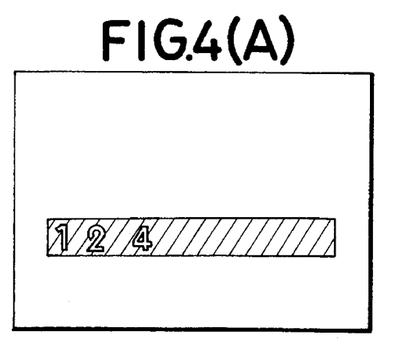
Figure 4B:
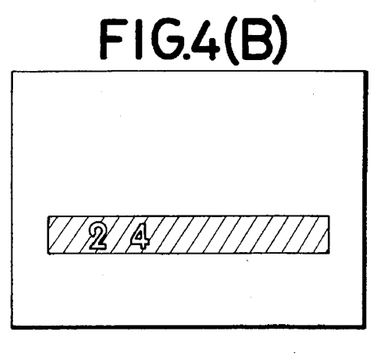

Step S116: The data of the address n (or the mark "?") is erased from the monitor 16. Step S117: Then, the erased state lasts 0.5 sec. At Steps S118 and S122: Checks are made for ON-states of the data off switch 54 and the data mode setting switch 53. If they are found in their ON-states respectively, the flow of operation comes back to the step S112 to repeat the loop of the steps S112 to S117. Therefore, the display of the data of the address n blinks at intervals of 0.5 sec as shown in FIGS. 2(A) and 2(B). Referring to these drawings, a reference symbol A denotes the image plane of the monitor and a symbol B a background. A white part in the background represents a character. FIGS. 3(A) and 3(B) show a display made on the monitor 16 in case where the address n is at 2. FIGS. 4(A) and 4(B) show a blinking display made in case where the address n is at 1 with data already set in positions for the address n up to 3. On the monitor 16, the characters (including the mark "?") corresponding to the data set in positions of the address n give a blinking display. This enables the operator to know the data setting position at the address n in setting the data by an interruption process described later or the like. Step S118: A check is made for the ON-state of the data off switch 54. If it is found on, the flow proceeds to a step S119. Step S119: The letter, background signal generator 10 is stopped from generating the background and character (letter) signals. In that case, the CPU 11 does not supply the data modulation circuit 12 with any data to be modulated. Accordingly, no data signal is recorded in that case.

Step S122: A check is made to see if the data mode setting switch 53 is in an ON-state. If not, the display one data of the address n which has been blinking at the steps S112 to S117 is lighted up at a step S123.

Further, in that instance, the CPU 11 supplies the data modulation circuit 12 with the set data. The data thus modulated is then recorded through the recording amplifier along with a video signal.

It is an advantage of this embodiment that the data signal to be recorded along with a video signal in a frequency multiplexing manner can be set in the form of characters, numerals, etc. on the monitor while observing and confirming on the monitor the video signal to be recorded.

Figure 7B:
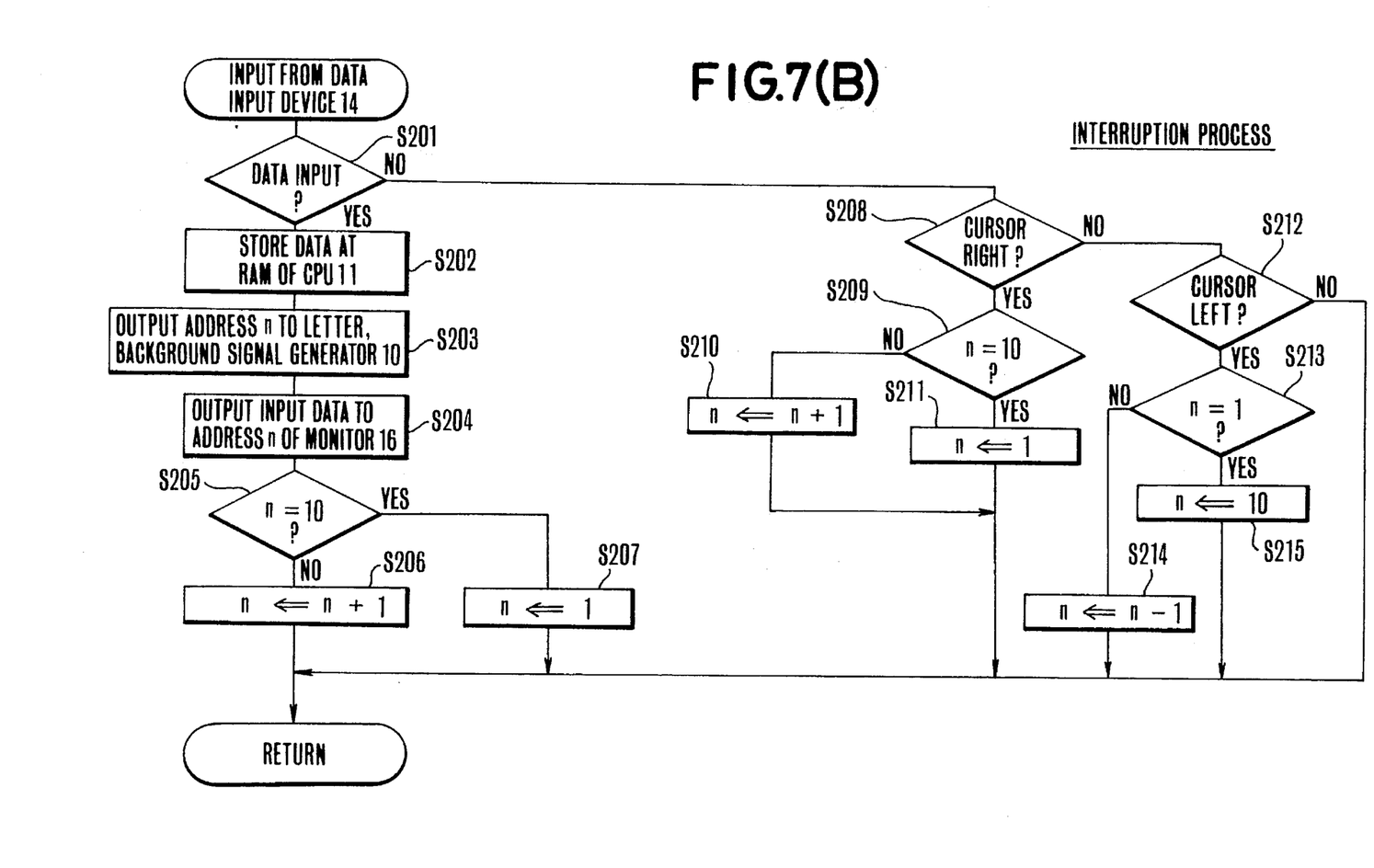

The above stated interruption process to be performed in the step S111 is arranged to be carried out as shown in FIG. 7(B) for the purpose of changing the address n and for setting data at the changed address n. Referring to FIG. 7(B), the interruption process is as follows: Step S201: A check is made for any input from the data input device 14 to the CPU 11. Step S202: In case of any input data from the device 14 including the data input switch for designating numerals "0" to "9", the input data is stored at an applicable address n of the RAM within the CPU 11. Step S203: The data of the applicable address n is supplied to the letter, background signal generator 10. Step S204: The letter, background signal generator 10 produces a character corresponding to the above stated input data and supplies it to the monitor 16 to have it displayed on the monitor 16 in a position corresponding to the applicable address. The flow then proceeds to a step S205. Step S205: A check is made to see if the value of the address n of the input data obtained at the step S201 is 10. If not, the flow comes to a step S206. Step S206: The address n of the address register within the CPU 11 is incremented by one and the flow returns. If the address n is found to be 10 at the step S205, the flow comes to a step S207. Step S207: The address n of the address register within the CPU 11 is brought back to 1 and the flow returns.

Step S208: In the event of no data input at the step S201, the cursor right switch 51 is turned on to change the address of data to be received. A check is made to see if a cursor moves to the right on the monitor (to effect an increase in the address). If so, the flow comes to a step S209. Step S209: A check is made to see if the address n selected by the cursor is 10. If not, the flow proceeds to a step S210. Step S210: The address n of the address register within the CPU 11 is incremented by one and the flow returns. If the address n is found to be 10, the flow comes to a step S211. Step S211: The address n of the address register is brought back to 1 and then the flow returns.

If the cursor does not move to the right in the step S208, the flow comes to a step S211. Step S212: The cursor left switch 52 is checked to find if it is turned on to cause the cursor to move to the left (to decrease the address). If so, the flow proceeds to a step S213. Step S213: A check is made to find if the address n selected by the cursor is 1. If not the flow proceeds to a step S214. Step S214: The address n of the address register of the CPU 11 is decremented by one and then the flow returns. If the address n selected by the cursor is found to be 1 at the step S213, the flow comes to a step S215. Step S215: The address n of the address register is made to be 10 and then the flow returns. The term "cursor" as used here means a flickering point as shown in FIGS. 2(A) to 4(B).

Figure 7C:
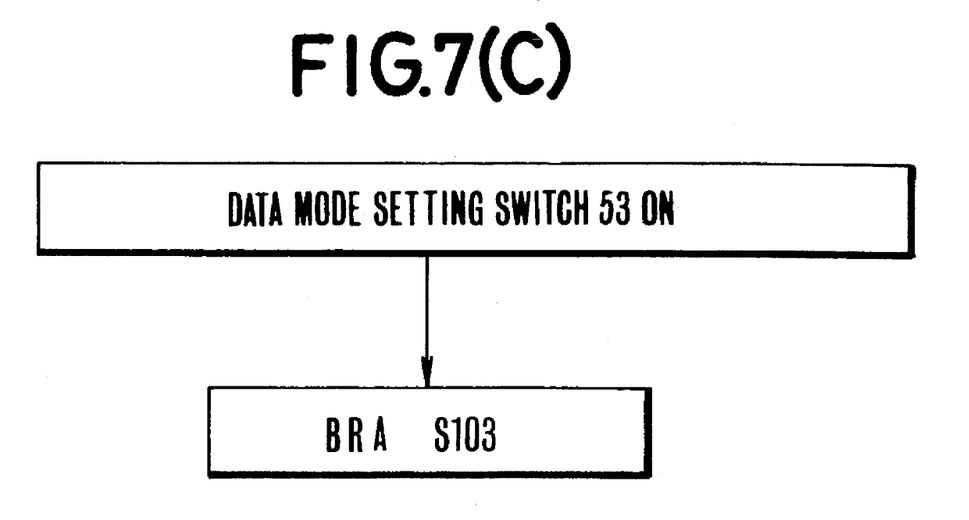

FIG. 7(C) shows another example of interruption process. In that case, the flow of operation jumps to the step S103 when the data mode setting switch 53 turns on during the process of steps from S112 to S117.

Figure 7D:
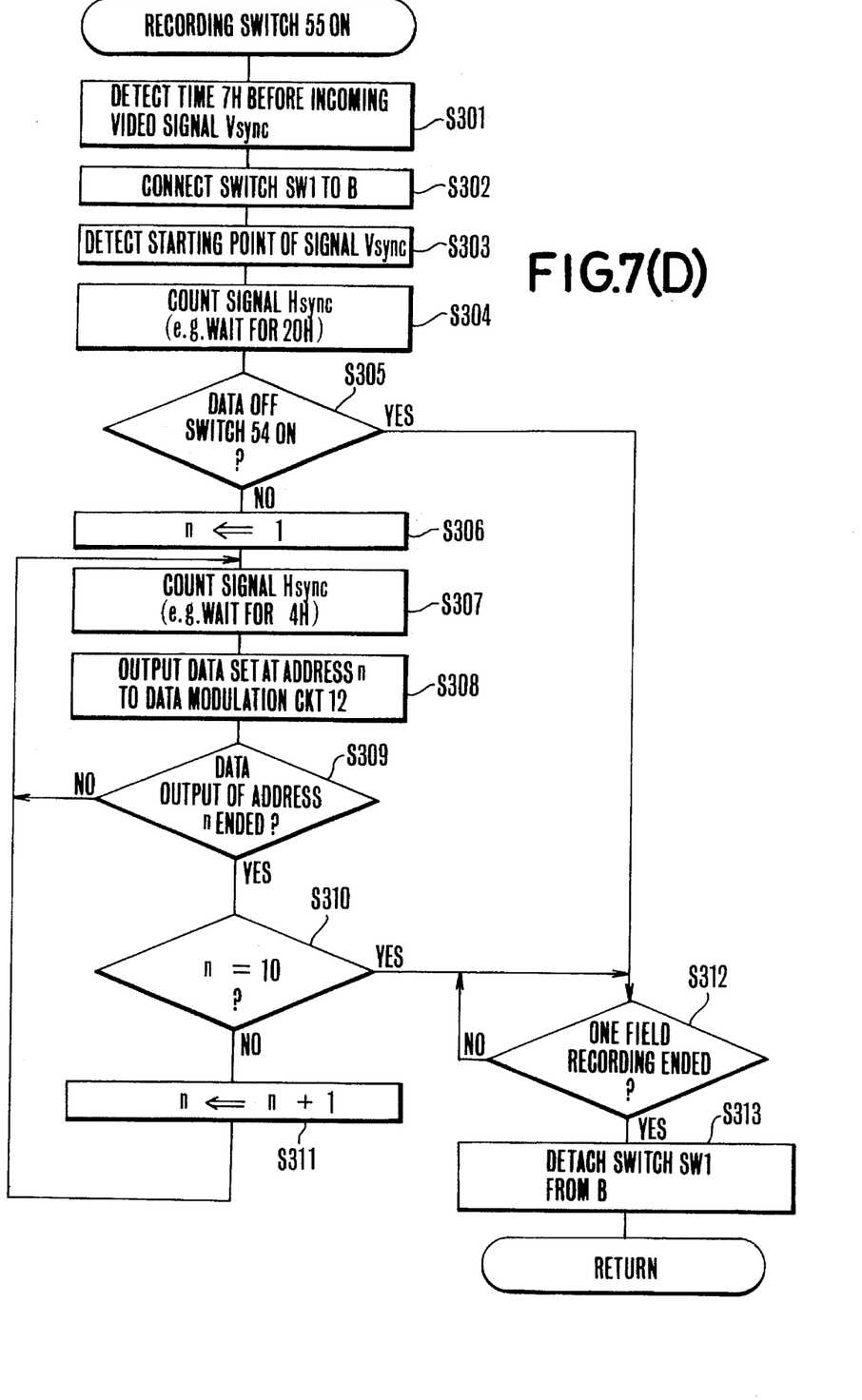

FIG. 7(D) shows a further example of interruption process. In this case, the flow of operation proceeds to a step S301 when the recording switch 55 turns on. Step S301: The CPU 11 detects from the output of the sync separation circuit 9 a timing obtained 7 H (H: horizontal period) before a video signal Vsync received at the input terminal 1. Step S302: Then, the connecting position of the switch SW1 is connected to one side B thereof at this detected timing. Step S303: The CPU 11 detects the initial or start point of the signal Vsync from the output of the sync separation circuit 9. Step S304: A 20 H portion of the horizontal synchronizing signal Hsync is counted.

Step S305: A check is made for the ON-state of the data off switch 54 which is provided for not recording the data displayed on the monitor (the data stored at the RAM of CPU 11). If it is not in the ON-state, it indicates a mode for recording an ID signal including the numerals etc. set by the data input device 14. Then, the flow of operation comes to a step S306. Step S306: The address n of the address register within the CPU 11 is made to be 1. Following that, the flow comes to a step S307. Step 307: For example, a 4 H portion of the horizontal synchronizing signal Hsync is counted. Step S308: Data stored (set) at the address n (=1) of the RAM of the CPU 11 is supplied to the data modulation circuit 12. The data is then recorded on the magnetic sheet 5 along with a video signal.

Step S309: A check is made to see if the data output of the address n has come to an end. If not, the loop of steps S307 to S309 is repeated until the data output comes to an end. By this, the data is recorded on the magnetic sheet 5 in units of 4 H periods. If the data output is found to have come to an end at the step S309, the flow of operation comes to a step S310. Step S310: The address n of the address register within the CPU 11 is checked to see if it is 10. If not, the flow proceeds to a step S311. Step S311: The address n is incremented by one and the flow comes back to the step S307 to repeat the loop of these steps. If the address n is found to be 10 at the step S310, it indicates an end of data recording. The flow then proceeds to a step S312. Step S312: The flow of operation waits for completion of recording one field portion of the video signal and proceeds to a step S313. Step S313: The switch SW1 is detached from the terminal B, and then returns. If the data off switch 54 is found to be on at the step S305, data recording is not performed and the flow comes to the step S312 and then to the step S313 before it returns.

Figure 7E:
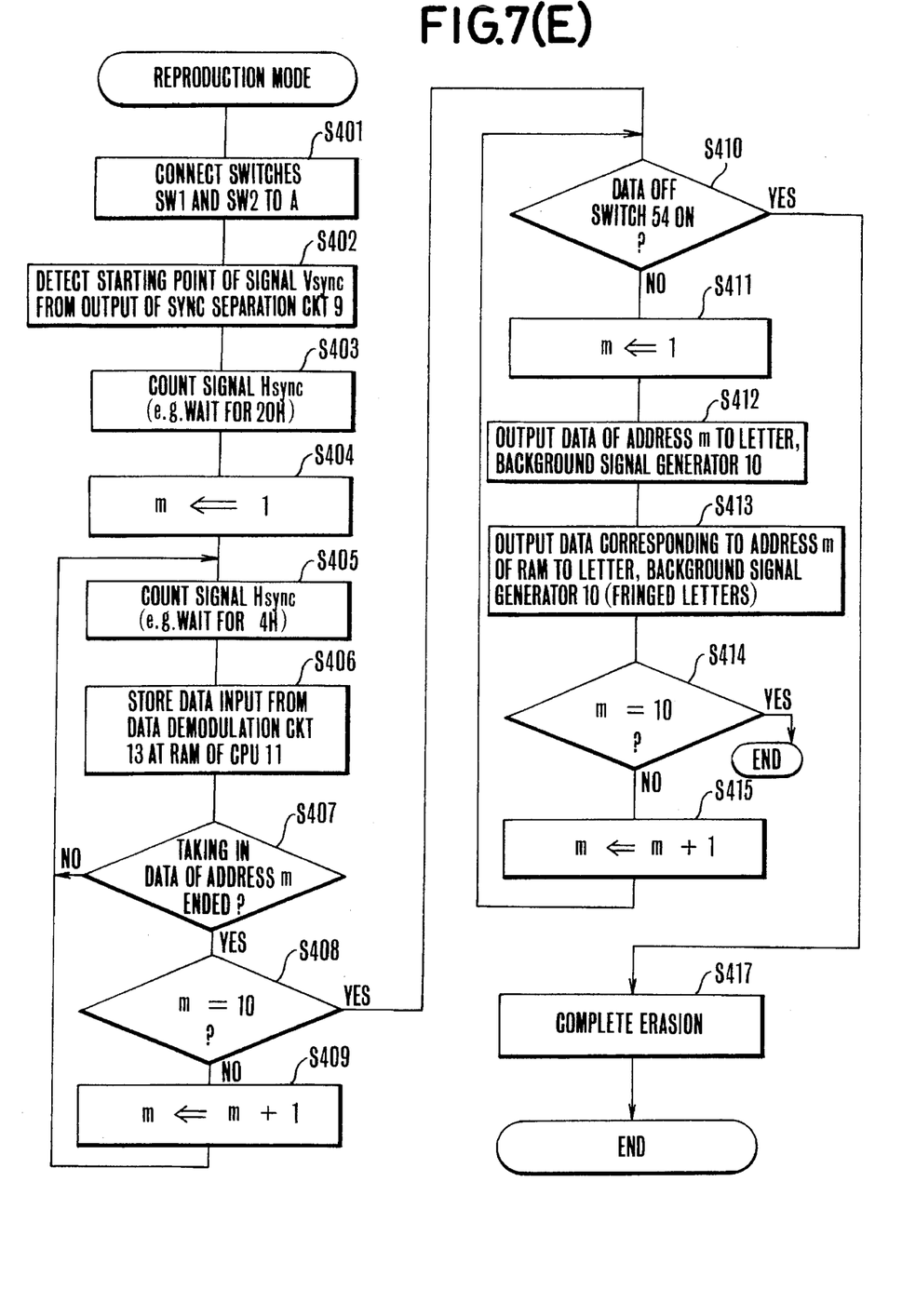

The operation in the reproducing mode which obtains with the reproduction switch 56 turned on is as described below with reference to FIG. 7(E):

Step S401: The connecting positions of the switches SW1 and SW2 are shifted respectively to their terminals A, while the interruption permitted in the step S111 is inhibited. Step S402: The initial or start point of a vertical synchronizing signal Vsync is detected from the output of the sync separation circuit 9 which separates synchronizing signals from the video signal reproduced from the magnetic sheet 5. Step S403: Then, a 20 H portion of a horizontable synchronizing signal Hsync is counted from the detected start point. Step S404: The address m of the address register within the CPU 11 is made to be 1 and the flow of operation proceeds to a step S405.

Step S405: A 4 H portion of the horizontal synchronizing signal Hsync is counted. Step S406: The data of the signal reproduced from the magnetic sheet 5 is demodulated by the data demodulation circuit 13. The demodulated data is stored at the address m (=1) of the RAM within the CPU 11. Step S407: A check is made for completion of the process of taking the data into the CPU 11. If the process is found not completed, the loop of the steps S405 to S407 is repeated. The data demodulation is thus performed in units of 4 H (periods). Upon completion of the process of taking the data in, the flow of operation proceeds to a step S408. Step S408: The address m of the address register within the CPU 11 is checked to see if it is at 10. If not, the flow comes to a step S409. Step S409: The value of the address m is incremented by one and the flow of operation comes back to the step S405. Then, the loop of steps S405 to S409 is repeated.

Figure 5:
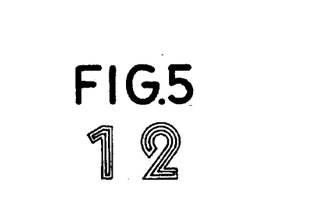

If the address m of the address register of the CPU 11 is found to be 10 at the step S408, the flow of operation comes to a step S410. Step S410: The data off switch 54 is checked to see if it is on. If so, the data is not displayed on the monitor and, therefore, all the data taken in is erased at a step S417. The program then comes to an end. If not, the flow proceeds to a step S411. Step S411: The address m of the address register of the CPU 11 is made to be 1. Step S412: The data of the address m is supplied to the letter, background signal generator 10. Step S413: Following this, the data stored at the applicable address m of the RAM within the CPU 11 is supplied to the letter, background signal generator 10. Then, a character or characters corresponding to this data are displayed on the monitor 16 in a fringed or bordered state as shown in FIG. 5. Then, the flow comes to a step S414.

Step S414: The address m of the address register of the CPU 11 is checked to see if it is 10. If not, the flow proceeds to a step S415. Step S415: The address m is incremented by one and the flow comes back to the step S410 to repeat the loop of steps S410 to S415 until the address m becomes 10. If the address m is found to be 10 at the step S414, the flow of operation comes to an end.

As described above, in the reproducing mode, the character (data) displayed on the monitor 16 is fringed or bordered and, in addition to that, has no background. Therefore, the data display in the reproducing mode is clearly distinguishable from the display of data to be recorded in the recording mode as the latter has a dark background without any fringe.

A second embodiment of this invention is arranged as described below with reference to FIG. 6 which shows it in a block diagram:

In the case of the second embodiment, the data display on the monitor for the recording mode is arranged to be distinguishable from the data display for the reproducing mode by differentiating the color of the display character from that of the display character for the reproducing mode. This arrangement ensures an easy discrimination between data setting in the recording mode and the data display in the reproducing mode.

Figure 6:
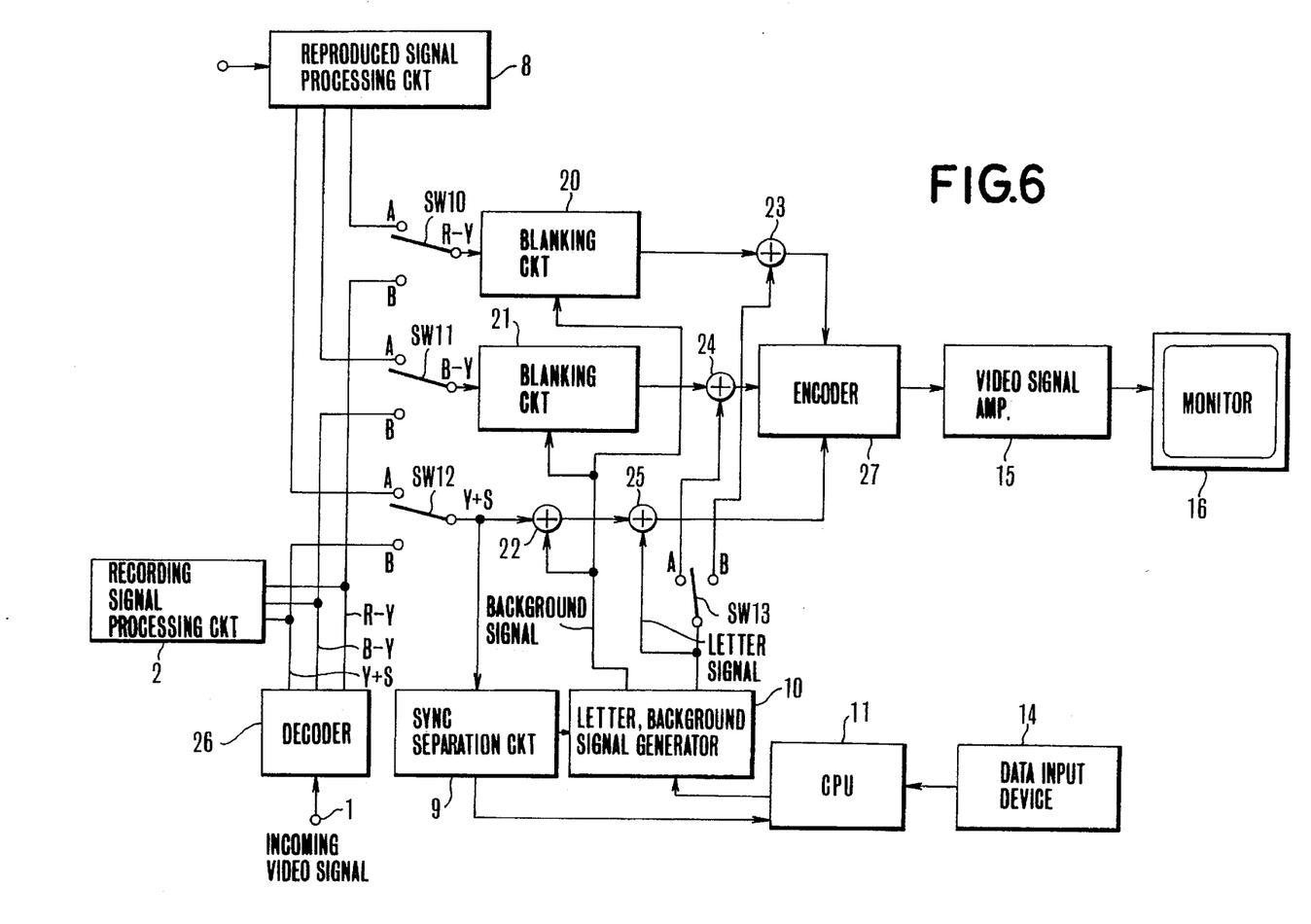
FIG. 6 is a block diagram showing a second embodiment of this invention.

The illustration given in FIG. 6 is limited to components and parts related to the display of letters, characters and a background. The parts which are the same as those shown in FIG. 1 are indicated by the same reference numerals. Referring to FIG. 6, a video signal coming via an input terminal 1 is received by a decoder 26. The decoder 26 divides it into a luminance signal Y and color-difference signals R-Y and B-Y.

Under a recording mode condition, the connecting positions of all switches SW10, SW12 and SW13 are on the side of their terminals B. A letter, background signal generator 10 is under the control of a CPU 11. Data received via a data input device 14 is displayed on a monitor 16 in a state of being multiplexed together with a video signal with a background added thereto. More specifically, a background signal generated by the letter, background signal generator 10 is supplied to blanking circuits 20 and 21. A blanking process is applied to the color-difference signals R-Y and B-Y to mute them for the period of the background signal. The luminance signal is supplied to an addition circuit 22 via the switch SW12. The background signal from the letter, background signal generator 10 is then added to the luminance signal to lower the luminance level of the latter. Meanwhile, a letter or character signal generated from the letter, background signal generator 10 is applied to another addition circuit 23.

In the recording mode, therefore, recording data with a black background is displayed on the monitor 16 in the form of a red character or characters multiplexed together with a video signal formed by the encoder 27.

Under a reproducing mode condition, the connecting positions of switches SW10, SW11, SW12 and SW13 are all shifted to their terminals A. A character signal generated by the letter, background signal generator 10 is supplied to an addition circuit 24. In this instance, the monitor 16 displays a blue character or characters on a black background as reproduced data.

The color of the character displayed on the monitor thus enables the operator to readily know whether the operation of the apparatus is in the recording mode or in the reproducing mode. The arrangement to switch the supply of the character signal to the addition circuits 23 and 24 from one over to the other by means of the switch SW13 according to the recording mode or the reproducing mode may be replaced with a different arrangement in which: The adding ratio of the character signal is differentiated between the recording and reproducing modes with the color of character display selected as desired. In another possible modification, the data area having the reproduced character during reproduction is displayed with a background while no background is displayed in an area having no character display. In short, any arrangement is acceptable as long as the reproduced data and the data being set for recording are distinguishable from each other.

In the embodiments described, a disc-shaped medium is employed as recording medium. However, this invention is of course not limited to the medium of that type. The medium may be replaced with a medium of some different shape or a solid-state memory such as a semiconductor memory.

While the data signal for setting data is described to be the data supplied to the data input device 14, the data may be replaced with some data that is automatically renewed on the side of the apparatus such as time.

The embodiments described are capable of differentiating the data display for reproduction from the data display for recording. The display readily enables the operator to make a discrimination between a mode in which data setting is possible and a mode in which data setting is impossible.

What is claimed is:

1. An image signal recording/reproducing apparatus for recording an image signal on a recording medium and reproducing the image signal recorded on the recording medium, comprising:
   a) data setting means for setting the contents of information data to be recorded on the recording medium along with the image signal and outputting the information data indicating the set contents;

b) recording-and-reproducing means having a recording mode in which the image signal is recorded on the recording medium with the information data set by said data setting means added to the image signal, and a reproducing mode in which the image signal and the information data are reproduced from the recording medium and outputting the reproduced image signal and the reproduced information data, said recording-and-reproducing means being arranged to operate either in the recording mode or in the reproducing mode;

c) image signal generating means arranged to receive the information data to generate an image signal indicative of an image which corresponds to the information data received;

d) instructing means for giving an instruction for causing said recording-and-reproducing means either to operate in the recording mode or to operate in the reproducing mode; and e) control means for controlling said image signal generating means to generate an image signal corresponding to an image whose representations in the recording mode and the reproducing mode are different at least in part to each other in accordance with selection of the recording mode or the reproducing mode instructed by said instruction means.

2. An apparatus according to claim 1, wherein said data setting means is arranged to set characters and numerals as the contents of the information data.

3. An apparatus according to claim 2, wherein said control means is arranged to cause said image signal generating means to generate an image signal of the characters and numerals corresponding to the information data supplied from said data setting means and an image signal of the characters and numerals corresponding to the information data supplied from said recording-and-reproducing means in different forms from each other.

4. An apparatus according to claim 2, wherein said control means is arranged to cause said image signal generating means to generate an image signal of the characters and numerals corresponding to the information data supplied from said data setting means and generate an image signal of the characters and numerals corresponding to the information data supplied from said recording-and-reproducing means on respective different backgrounds.

5. An apparatus according to claim 1, wherein said recording-and-reproducing means includes an information data modulating circuit arranged to modulate information data outputted from said data setting means and to output the modulated information data.

6. An apparatus according to claim 5, wherein said recording-and-reproducing means further includes an image signal modulating circuit arranged to modulate the image signal inputted.

7. An apparatus according to claim 1, wherein said recording-and-reproducing means includes an information data demodulating circuit arranged to demodulate information data obtained from a signal reproduced from the recording medium.

8. An apparatus according to claim 7, wherein said recording-and-reproducing means further includes an image signal demodulating circuit arranged to demodulate an image signal obtained from the signal reproduced from the recording medium.

9. An image signal recording/reproducing apparatus for recording an image signal on a recording medium and reproducing the image signal recorded on the recording medium, comprising:

a) recording-and-reproducing means having a recording mode in which the image signal is recorded on the recording medium and a reproducing mode in which the image signal is reproduced from the recording medium, said recording-and-reproducing means being arranged to operate either in the recording mode or in the reproducing mode;

b) image signal generating means arranged to receive information data and generate an image signal indicative of an image which corresponds to the information data inputted;

c) instructing means for giving an instruction for causing said recording-and-reproducing means either to operate in the recording mode or to operate in the reproducing mode; and d) control means arranged to cause said image signal generating means to generate an image signal corresponding to characters of a shape which varies with selection of the recording mode or the reproducing mode in accordance with the instruction of said instructing means.

10. An apparatus according to claim 9, further comprising data setting means for setting the contents of the information data and outputting information data which indicates the set contents.

11. An apparatus according to claim 10, wherein said recording-and-reproducing means is arranged such that, in the recording mode, said recording-and-reproducing means receives the information data outputted from the data setting means and records the input information data and the image signal on the recording medium and, in the reproducing mode, said recording-and-reproducing means reproduces the image signal and the information data from the recording medium and outputs the reproduced image signal and the reproduced information data.

12. An apparatus according to claim 9, wherein said image signal generating means is arranged to generate an image signal indicative of a character image having a background which corresponds to the contents of the information data inputted.

13. An apparatus according to claim 9, wherein said control means is arranged to cause said image signal generating means to generate an image signal indicative of a character image with a background added thereto, said background being arranged to vary with selection of the recording mode or the reproducing mode in accordance with the instruction of said instructing means.

14. An apparatus according to claim 9, wherein said control means is arranged to cause said image signal generating means to generate an image signal indicative of a character image with a background added, the color of said background being arranged to vary with selection of the recording mode or the reproducing mode in accordance with the instruction of said instructing means.

* * * * *